United States Patent
Shinde et al.

(10) Patent No.: US 8,816,636 B2
(45) Date of Patent: Aug. 26, 2014

(54) CONSOLE DOOR POCKET FOR ELECTRONIC DEVICES

(75) Inventors: Vishal E. Shinde, Troy, MI (US); Cornel D. Mititelu, Troy, MI (US); Thomas A. Miller, Royal Oak, MI (US)

(73) Assignee: Toyoda Gosei Co., Ltd., Aichi (JP)

( * ) Notice: Subject to any disclaimer, the term of this patent is extended or adjusted under 35 U.S.C. 154(b) by 343 days.

(21) Appl. No.: 13/232,899

(22) Filed: Sep. 14, 2011

(65) Prior Publication Data

US 2012/0091948 A1 Apr. 19, 2012

Related U.S. Application Data

(60) Provisional application No. 61/382,893, filed on Sep. 14, 2010.

(51) Int. Cl.
*H02J 7/00* (2006.01)
*H01F 27/42* (2006.01)

(52) U.S. Cl.
USPC .......................................... 320/108; 307/104

(58) Field of Classification Search
USPC .......................................... 320/108; 307/104
See application file for complete search history.

(56) References Cited

U.S. PATENT DOCUMENTS

| | | | | |
|---|---|---|---|---|
| 5,064,974 A | * | 11/1991 | Vigneau et al. | 200/61.62 |
| 5,479,155 A | * | 12/1995 | Zeinstra et al. | 340/5.25 |
| 6,362,771 B1 | * | 3/2002 | Schofield et al. | 341/176 |
| 6,722,719 B1 | * | 4/2004 | Sturt | 296/37.8 |
| 6,943,666 B2 | * | 9/2005 | Mooney et al. | 340/10.5 |
| 2007/0013202 A1 | * | 1/2007 | Tompson | 296/37.1 |
| 2008/0001572 A9 | * | 1/2008 | Baarman et al. | 320/108 |
| 2009/0075704 A1 | * | 3/2009 | Wang | 455/573 |
| 2010/0264871 A1 | * | 10/2010 | Matouka et al. | 320/108 |
| 2011/0140540 A1 | * | 6/2011 | Chu et al. | 307/104 |
| 2011/0187321 A1 | * | 8/2011 | Hirayama | 320/108 |
| 2011/0221389 A1 | * | 9/2011 | Won et al. | 320/108 |
| 2011/0291615 A1 | * | 12/2011 | Pandya et al. | 320/108 |
| 2012/0299538 A1 | * | 11/2012 | Arai et al. | 320/108 |
| 2013/0285603 A1 | * | 10/2013 | Zeinstra et al. | 320/108 |

* cited by examiner

*Primary Examiner* — M'Baye Diao
(74) *Attorney, Agent, or Firm* — Carlson, Gaskey & Olds, P.C.

(57) ABSTRACT

A wireless power charging or supply system provides a wireless charging coil mounted on or in console in a vehicle interior. Electronic devices placed in or near the console are powered and/or charged by the charging coil. The charging coil may be located in a door having a pocket for receiving the electronic device.

19 Claims, 4 Drawing Sheets

CONSOLE DOOR POCKET FOR ELECTRONIC DEVICES

This application claims priority to U.S. Provisional Application Ser. No. 61/382,893, filed Sep. 14, 2010.

BACKGROUND

Wireless charging of electronic devices via induction is becoming more standard. Electronic devices can be charged or powered via induction without direct electrical conductive contact. There are several standards, including Qi, but any wireless or inductive power supply or charging could be used in the present invention.

SUMMARY

A wireless power charging or supply system according to one embodiment of the present invention provides a wireless power coil mounted in a vehicle console. An electronic device with a complementary coil placed near the power coil can be powered wirelessly by the power coil.

In another feature, a wireless power coil is mounted in a pivotable door having a pocket for receiving an electronic device. An electronic device with a complementary coil placed in the pocket can be powered wirelessly by the power coil.

DETAILED DESCRIPTION OF THE PREFERRED EMBODIMENT

Figure 1:
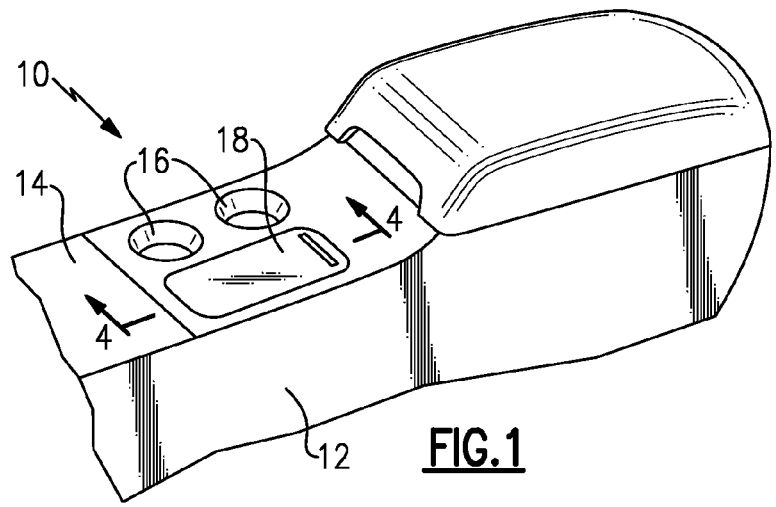
FIG. 1 shows a vehicle console according to one embodiment.
Figure 2:
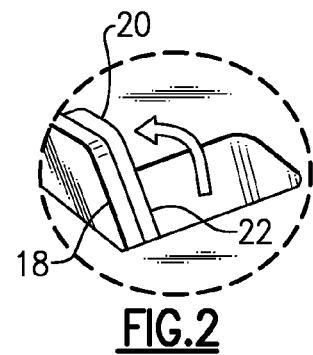
FIG. 2 is an enlarged view of a portion of FIG. 1, showing the door in an open position.

A wireless charging/power system 10 for a vehicle console according to one embodiment of the present invention is shown in FIGS. 1-4. A vehicle console includes side walls 12 and an upper wall 14. Cup holders 16 or other small storage areas may be formed in the upper wall 14. A door 18 is mounted in the upper wall 14. The door 18 is pivotably mounted to the console, such that it can pivot forward in the vehicle, as shown in FIG. 2, such that the device 20 can be viewed by the driver and passenger.

As shown in FIG. 2, the device 20 is removably inserted into a pocket 22 formed on an underside of the door 18. An upper portion (a third or a half) of the device 20 protrudes outward of the pocket 22, so that it is visible.

Figure 3:
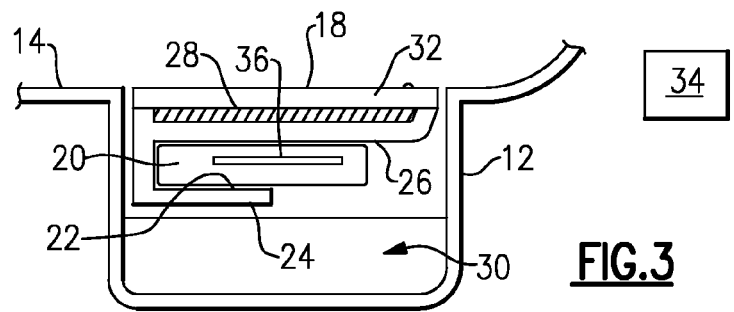
FIG. 3 is a section view of the console with the door in the closed position

FIG. 3 is a section view of the console with the door 18 in the closed position. The door 18 includes an inner wall 24 and a mid-wall 26 defining the pocket 22 therebetween. The door 18 further includes an outer wall 32 spaced outwardly of the mid-wall 26 to enclose a power coil 28 for a wireless charging point. The power coil 28 is connected to a power source 34 (connections not shown for simplicity), which provides current to the power coil 28 in a manner according to the proper standard. The power source 34 may supply alternating current to the power coil 28. The device 20 includes a built-in (or add-on) receiving coil 36 for receiving power from the power coil 28 according to the appropriate standard. This can be used to power and/or charge the device 20 (in all of the embodiments herein, the device 20 could be a phone or other electronic device, such as music player, video player, gps unit, or any communications, navigations, entertainment or other electronic device). When the door 18 is closed, as shown in FIG. 3, there is still storage space 30 in the console.

Figure 4:
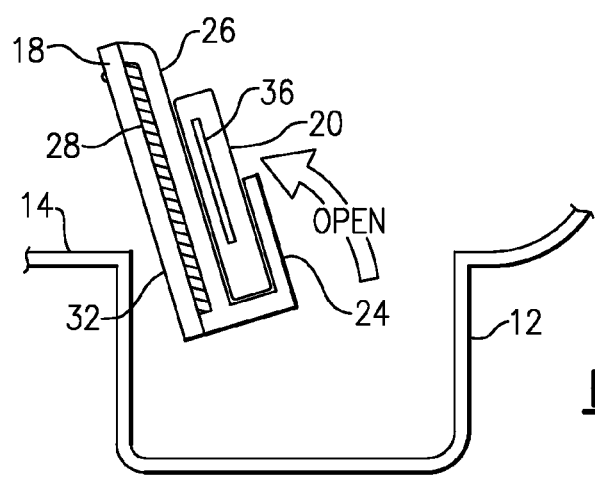
FIG. 4 shows the console of FIG. 3 with the door open.

As shown in FIG. 4, the door 18 can be pivoted forward to a position where the upper portion of the device 20 is visible to the driver and passenger of the vehicle. In this position, the device 20 is still charged/powered by the power coil 28.

Figure 5:
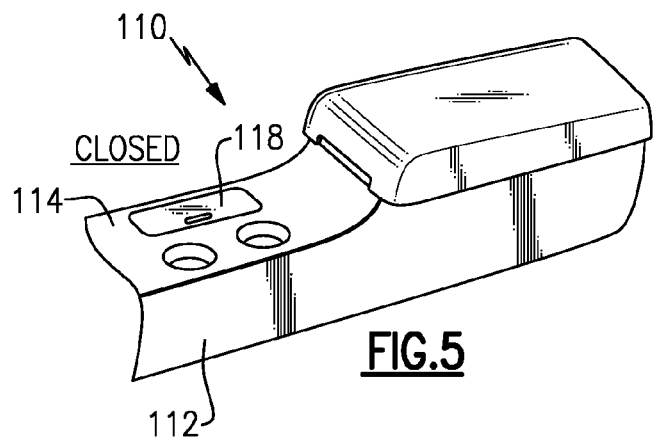
FIG. 5 shows a console according to a second embodiment.
Figure 6:
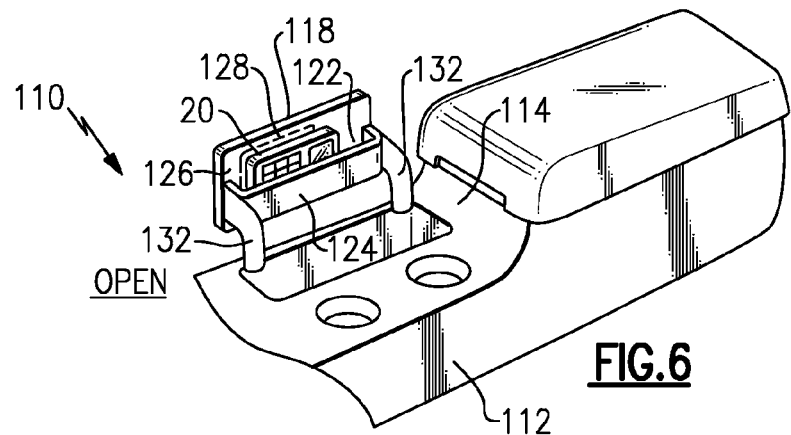
FIG. 6 shows the console of FIG. 5 with the door open.

FIGS. 5 and 6 show a console 110 according to a second embodiment. The console 110 includes side walls 112 and an upper wall 114 having a door 118 pivotably mounted therein. The door 118 in this embodiment includes a pocket 122 defined by an inner wall 124. Again, a power coil 128 is mounted between a mid-wall 126 and an outer wall 132. In this embodiment, the door 118 pivots to the side, in this example, away from the driver such that the driver can easily access the pocket 122 formed on the interior side of the door 118. The door 118 may be mounted by arms 132 to the console.

Figure 7:
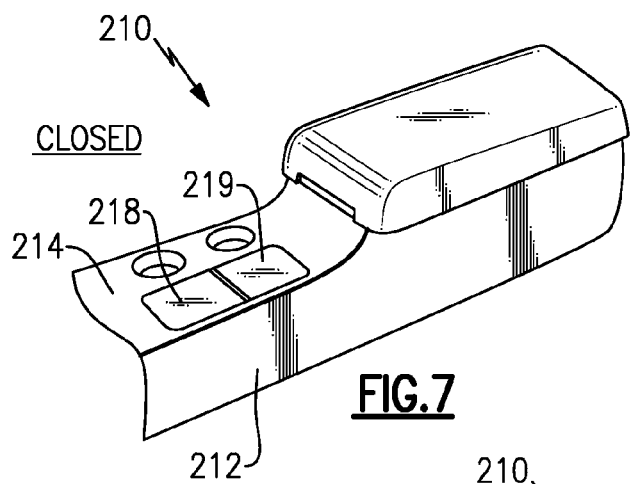
FIG. 7 shows a console according to a second embodiment.
Figure 8:
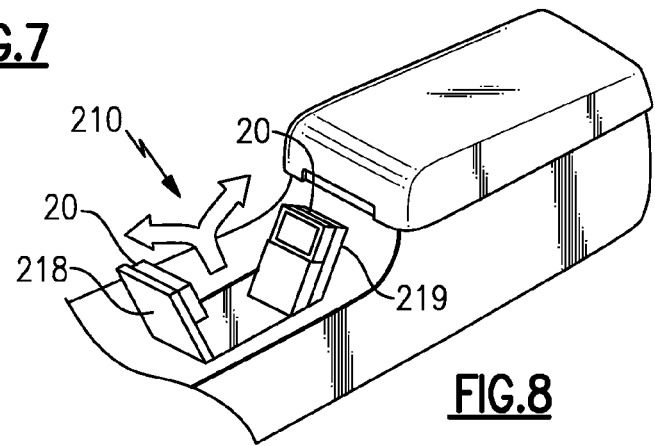
FIG. 8 shows the console of FIG. 7 with the door open.

Referring to FIGS. 7 and 8, a console 210 according to a third embodiment includes two doors 218, 219 pivoting away from one another. As shown in FIG. 8, each door 218, 219 can hold a device 20, while providing power/charging to the device 20 via a power coil (not shown) as in the previous embodiments.

Figure 9:
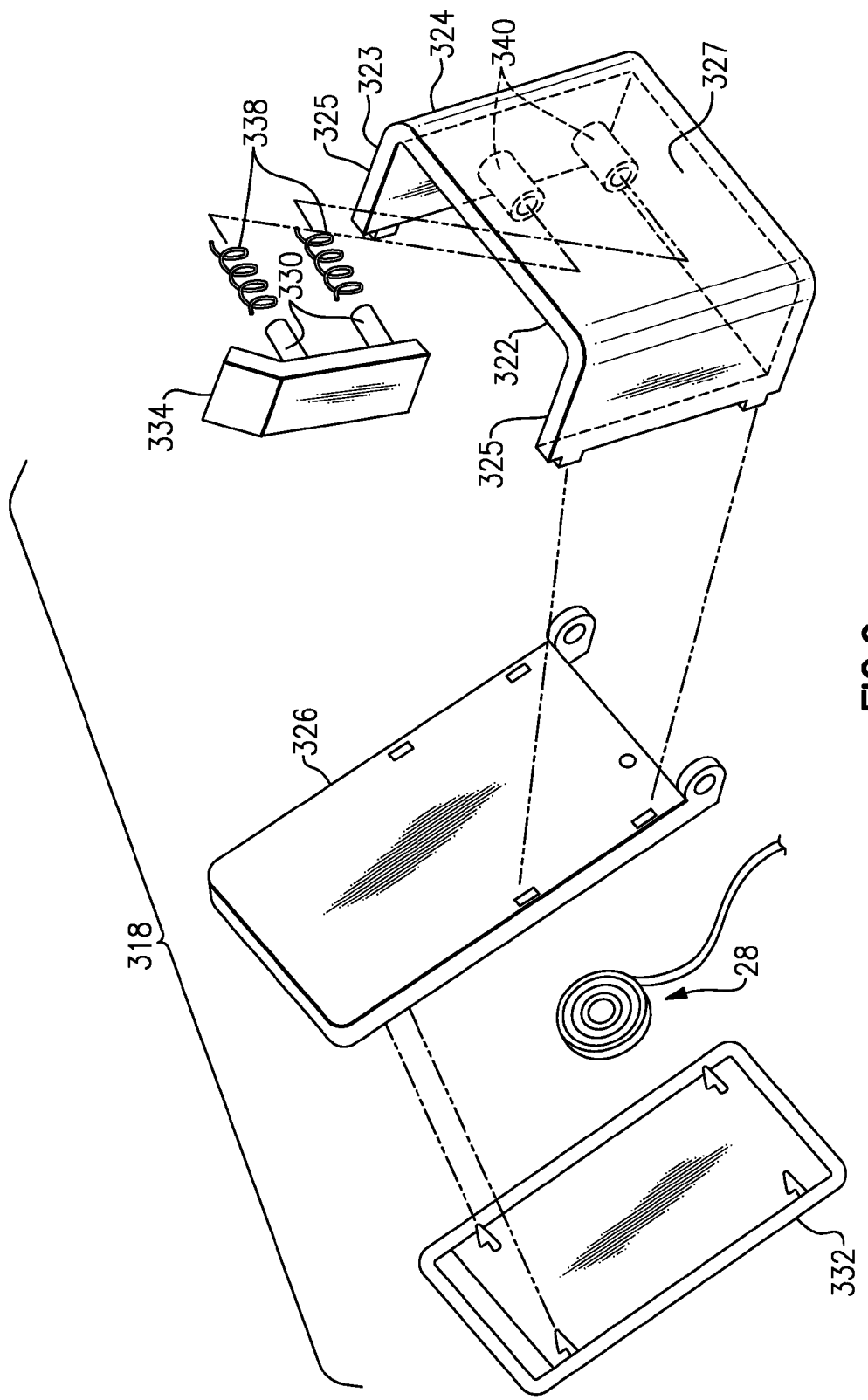
FIG. 9 is an exploded view of one possible door that could be used in the consoles of FIGS. 1-8.
Figure 11:
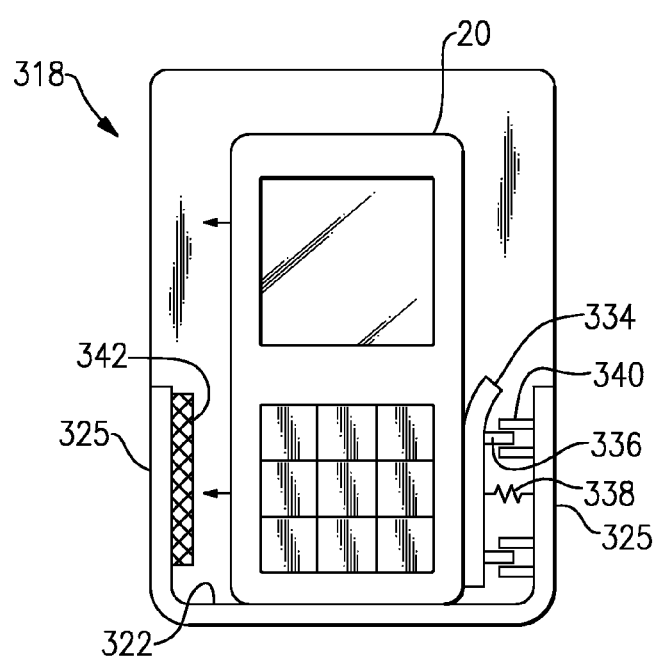
FIG. 11 is a front view of the door and phone of FIG. 10.
Figure 10:
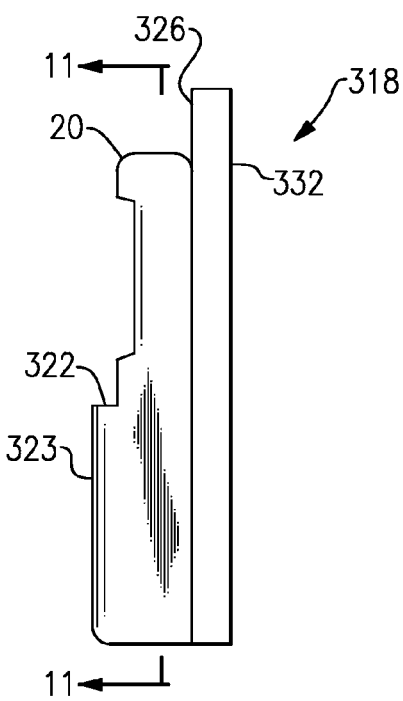
FIG. 10 is a side view of the door of FIG. 9 with a phone inserted into the pocket.

FIGS. 9-11 show one possible construction of a door 318 that could be used as the doors in the embodiments of FIGS. 1-8. The door 318 includes an outer wall 332 snap-fit to a mid-wall 326 around a power coil 28. An inner portion 323 includes an inner wall 324, side walls 325 and a lower wall 327 defining the pocket 322 with the mid-wall 326. The side walls 325 are snap-fit to the mid-wall 326 to connect the inner portion 323 to the mid-wall 326. The inner section 323 further includes guides 340 for receiving pins 336 of a slide 334. The slide 334 is biased by springs 338 away from the guides 340.

FIGS. 10 and 11 show the door 318 with a device 20 inserted into the pocket 322. The slide 334 is biased by the springs 338 to push the device 20 against the opposite side wall 325, which may have a felt, foam or neoprene pad 342 to increase the friction and reduce vibration.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A wireless power supply including:
   a power coil mounted to a vehicle console, wherein the console includes a pivotable door and the power coil is mounted to the pivotable door; and
   a power source connected to the power coil, the power source providing power to the power coil such that the power coil can wirelessly charge a device having a receiving coil.

2. The wireless power supply of claim 1 wherein the pivotable door includes a pocket for receiving the device.

3. The wireless power supply of claim 1 wherein the power source is an AC power source.

4. The wireless power supply of claim 1 further including a slide biased to retain the device proximate the power coil.

5. The wireless power supply of claim 4 further including pocket formed on the console, the pocket including the slide.

6. The wireless power supply of claim 5 wherein the power coil is adjacent the pocket.

7. The wireless power supply of claim 6 further including a door pivotably mounted to the console, the pocket formed in the door.

8. The wireless power supply of claim 7 wherein the door is pivotable forward in the vehicle such that the electronic device is accessible.

9. The wireless power supply of claim 4 wherein the slide is biased by springs toward the power coil and wherein the slide is slidably mounted to the door via at least one pin slidably mounted within a guide.

10. The wireless power supply of claim 9 wherein the slide biases the device against a pad to increase friction and reduce vibration.

11. The wireless power supply of claim 1 in combination with the device having the receiving coil, the device selectively retained to the console proximate the power coil for charging the device.

12. The wireless power supply of claim 11 wherein the device is a phone.

13. A method for charging a device wireless in a vehicle including the steps of:

a) pivoting a door in a console forward, a power coil mounted proximate the door;

b) placing an electronic device in a pocket in the door on the console in a vehicle; and c) causing the power coil to transmit power to a receiving coil connected to the electronic device.

14. A wireless power supply including:

a power coil mounted to a door pivotably mounted in a vehicle; and a power source connected to the power coil, the power source providing power to the power coil such that the power coil can wirelessly charge or power a device having a receiving coil located in the door.

15. The wireless power supply of claim 14 wherein the door includes a pocket for receiving the device.

16. The wireless power supply of claim 15 wherein the power source is an AC power source.

17. The wireless power supply of claim 15 wherein the door is pivotable forward in the vehicle such that the electronic device is accessible.

18. The wireless power supply of claim 14 further including a slide biased to retain the device proximate the power coil.

19. The wireless power supply of claim 14 in combination with the device having the receiving coil, the device selectively retained to the door proximate the power coil for charging the device.

\* \* \* \* \*